(12) United States Patent
Zhang et al.

(10) Patent No.: US 10,397,574 B2
(45) Date of Patent: Aug. 27, 2019

(54) VIDEO CODING QUANTIZATION PARAMETER DETERMINATION SUITABLE FOR VIDEO CONFERENCING

(71) Applicant: Intel Corporation, Santa Clara, CA (US)

(72) Inventors: Ximin Zhang, San Jose, CA (US); Sang-Hee Lee, Santa Clara, CA (US); Zhijun Lei, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 573 days.

(21) Appl. No.: 14/275,109

(22) Filed: May 12, 2014

(65) Prior Publication Data

US 2015/0326857 A1    Nov. 12, 2015

(51) Int. Cl.
*H04N 7/12*     (2006.01)
*H04N 19/124*   (2014.01)
*H04N 19/172*   (2014.01)
*H04B 1/66*     (2006.01)
*H04N 19/503*   (2014.01)
*H04N 19/593*   (2014.01)
*H04N 19/65*    (2014.01)
*H04N 19/14*    (2014.01)
(Continued)

(52) U.S. Cl.
CPC .......... *H04N 19/124* (2014.11); *H04N 19/14* (2014.11); *H04N 19/142* (2014.11); *H04N 19/146* (2014.11); *H04N 19/172* (2014.11); *H04N 19/503* (2014.11); *H04N 19/593* (2014.11); *H04N 19/65* (2014.11)

(58) Field of Classification Search
CPC .... H04N 19/124; H04N 19/14; H04N 19/146; H04N 19/142; H04N 19/65; H04N 19/503; H04N 19/172; H04N 19/593
USPC .................................................. 375/240, 24
See application file for complete search history.

(56) References Cited

U.S. PATENT DOCUMENTS

| | | | |
|---|---|---|---|
| 7,330,509 B2 * | 2/2008 | Lu .......................... | H04N 19/40 375/240.03 |
| 2004/0114817 A1 * | 6/2004 | Jayant .................... | H04N 19/00 382/239 |

(Continued)

*Primary Examiner* — Susan E. Hodges
(74) *Attorney, Agent, or Firm* — Green, Howard & Mughal LLP.

(57) ABSTRACT

Systems and methods for determining quantization parameter (QP) for video coding. Embodiments may be particularly advantageous for strongly temporal correlated frames, such as for video conferencing applications. An initial QP for a frame of a video sequence may be modified based on a spatial complexity or a temporal complexity associated with the video frame, and/or based on an inter-predicted frame bitrate target cycle, as a function of whether the frame is intra- or inter-predicted. The inter-predicted frame bitrate target cycle includes a sequence of two or more inter-predicted frame bitrate targets that are assigned to the frame according to the inter-predicted frame bitrate target cycle. A reference frame for an inter-predicted frame may be selected based on the bitrate target associated with candidate reference frames. Initial QP of an inter-predicted frame with a scene change may be modified in a manner independent of an inter-predicted frame bitrate target cycle.

25 Claims, 10 Drawing Sheets

(51) Int. Cl.
*H04N 19/142* (2014.01)
*H04N 19/146* (2014.01)

(56) References Cited

U.S. PATENT DOCUMENTS

| | | | | |
|---|---|---|---|---|
| 2007/0071094 A1* | 3/2007 | Takeda | .................. | H04N 19/197 375/240.04 |
| 2007/0172211 A1* | 7/2007 | Panda | .................. | H04N 19/117 386/313 |
| 2009/0086816 A1* | 4/2009 | Leontaris | ............. | H04N 19/154 375/240.03 |
| 2010/0080292 A1* | 4/2010 | Coulombe | ........... | H04N 19/159 375/240.12 |
| 2011/0051806 A1* | 3/2011 | Lee | ...................... | H04N 19/159 375/240.03 |
| 2011/0090960 A1* | 4/2011 | Leontaris | ............. | H04N 19/103 375/240.12 |
| 2015/0373328 A1* | 12/2015 | Yenneti | .................. | H04N 19/61 375/240.03 |

* cited by examiner

VIDEO CODING QUANTIZATION PARAMETER DETERMINATION SUITABLE FOR VIDEO CONFERENCING

BACKGROUND

Visual quality is an important aspect of the user experience in many media applications. Furthermore, in compression/decompression (codec) systems, visual quality may be primarily based on the compression format used. For example, a video encoder compresses video information so that more information can be sent over a given bandwidth or stored in a given memory space, etc. The compressed signal or data may then be decoded via a decoder that decodes or decompresses the signal or data for display to a user.

Video conferencing is an important application for video encoding. The video captured in video conferencing applications usually has different characteristics from other common video applications such as broadcast TV programming, and the like. Many conventional video encoding solutions ignore the unique characteristics of video conferencing, and as a result the compression efficiency and/or visual quality is not high. In one approach for example, a constant quantization parameter (QP) is used. Transform coefficients obtained via an encoding technique such as the H.264/MPEG-4 Advanced Video Coding (AVC) standard or the High Efficiency Video Coding (HEVC) standard or the like may be quantized using the constant QP. A larger QP value results in greater compression at the cost of lower quality, while lower QP values achieve greater visual quality at the cost of a reduced compression rate. Such constant QP approaches may not provide adequate visual quality for a video conferencing user. Furthermore, such constant QP approaches may be wasteful in compressing certain portions of video sequences (either spatially within a video frame or temporally across video frames).

As such, existing techniques for determining QP may not be satisfactory. As video conferencing end user expectations continue to increase, techniques for determining QP, and systems capable of performing such determinations become more advantageous in the market place.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
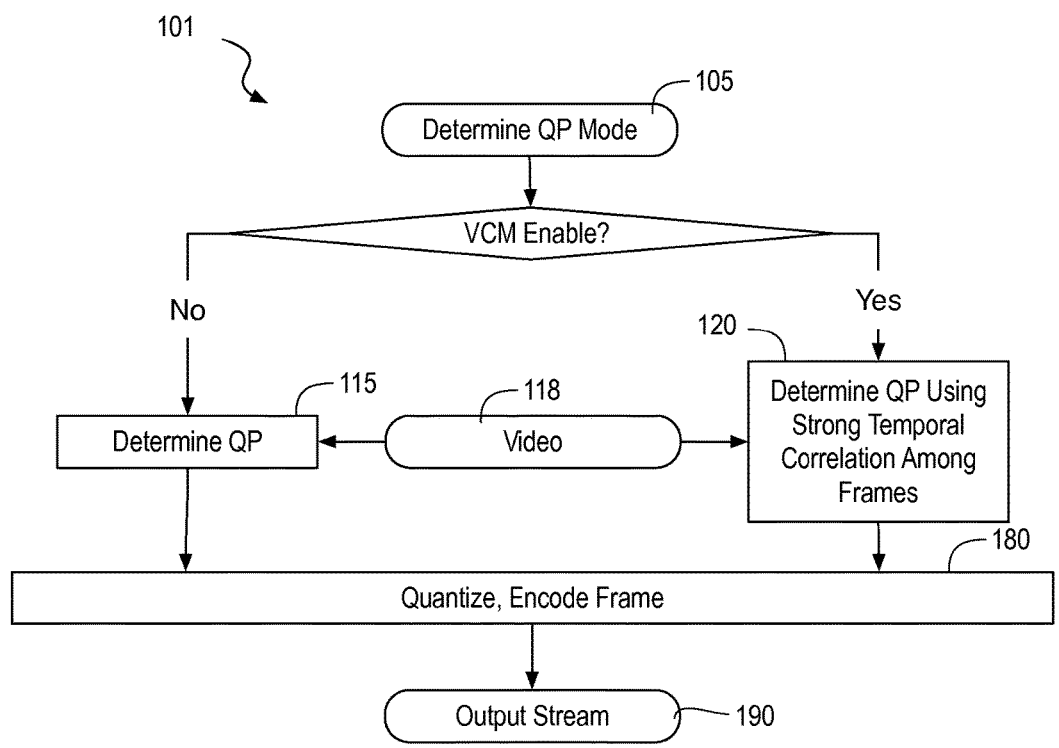
FIG. 1A is a flow diagram depicting a video encoding method that employs multiple QP determination modes, including a video conferencing mode, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Methods, devices, apparatuses, computing platforms, and articles described herein relate video coding. One or more system, apparatus, method, and computer readable media is described below to determine QP for frames of video. In further embodiments, the system, apparatus, method, or computer readable media may further generate an encoded video data stream based on the determined QP.

Embodiments described herein may be particularly advantageous for strongly temporal correlated frames, such as for conferencing applications. An initial QP for a frame of a video sequence may be modified based on a spatial complexity or a temporal complexity associated with the video frame, and/or based on an inter-predicted frame bitrate target cycle, as a function of whether the frame is intra- or inter-predicted. The inter-predicted frame bitrate target cycle includes a sequence of two or more inter-predicted frame bitrate targets that are assigned to the frame according to the inter-predicted frame bitrate target cycle. A reference frame for an inter-predicted frame may be selected based on the bitrate target associated with candidate reference frames. An initial QP of an inter-predicted frame with a scene change may be modified in a manner independent of an inter-predicted frame bitrate target cycle.

The QP as determined and/or modified in accordance with embodiments herein may be used to quantize transform coefficients associated with a chunk of video data. The quantized transform coefficients and quantization parameters may be encoded into a bitstream for use at a decoder. The decoder may decompress and/or decode the bitstream to reproduce frames for presentation/display to an end user.

FIG. 1A is a flow diagram depicting a video encoding method 101 that employs multiple QP determination modes, including a video conferencing mode (VCM), in accordance with an embodiment. Method 101 may for example be implemented by a video compression-decompression (codec) configured to encode input video 118 received from any upstream source. In exemplary embodiments, method 101 is implemented by a codec that is compatible with one or more standards, such as the H.264/MPEG-4 Advanced Video Coding (AVC) standard, or the High Efficiency Video Coding (HEVC) standard, or the like.

Video 118 may include any video frame, sequence of video frames, video data, or the like, at any suitable resolution. For example, video 118 may be video graphics array (VGA), high definition (HD), Full-HD (e.g., 1080p), 4K resolution video, etc. Furthermore, video 118 may include any number of video frames, sequences of video frames, or scenes or the like. During an encoding process, a frame type may be selected/determined for each video frame. The frame type may be any suitable frame type, for example as defined by a codec standard, protocol, etc. For example, the frame types may include intra-frames (I-frames) predicted without reference to another frame or frames, and inter-predicted frames predicted with reference to another frame or frames. Predicted frames may further include P-frames predicted with reference to a prior frame or frames and available for use in prediction of other frames, bi-directional frames (B-frames) predicted with reference to a prior or subsequent frame or frames but not available for use in prediction of other frames, and/or reference bi-directional frames (B-reference frames) predicted with reference to another frame or frames and available for use in prediction in hierarchical coding structures. The frame type may further be related to a reference depth level when hierarchical coding is enabled.

Method 101 begins at operation 105 where a mode for determining quantization parameter(s) is determined A mode selection flag or status indicator is queried at operation 105 to determine if the VCM is enabled, for example by an end user, or through a system parameter automatously set based on a communications connection or video conferencing appliance handshake, etc. If VCM mode has not been enabled, then method 101 proceeds to operation 115 where default QP determinations are applied to frames of input video 118. In response to VCM being enabled, method 101 proceeds to operation 120 where QP determinations for one or more of I-frames and inter-predicted frames (e.g., P-frames) of input video 118 account for a relatively strong temporal correlation among frames. The QP values output by operation 115 or 120 are then utilized for operating on any suitable transform coefficients such as, for example, coefficients based on a discrete cosine transform of luma data, chroma data, differential data (e.g., for differences between predicted blocks and actual blocks), etc. The quantized transform coefficients may then be scanned and further encoded to reduce data redundancy (e.g., run-length encoded, entropy encoded, etc.). At operation 190, the encoded stream is output to a memory or storage, and/or transmitted to a remote device for decoding and display, etc.

As shown in FIG. 1 the QP values output by operation 115 or 120 are at least one of the control points for modulating frame bitrates and/or reference frame selection in response to varying an operative mode of a codec. Where a lower QP value reduces a lossy compression rate, a lower QP value is associated higher bitrate and better video quality. Incorporating the premise that video conferencing applications have strong temporally correlated frames into the VCM QP determination may enable embodiments herein to more effectively determine frame-level QP values to provide better video conferencing quality for a given average bitrate.

Figure 1B:
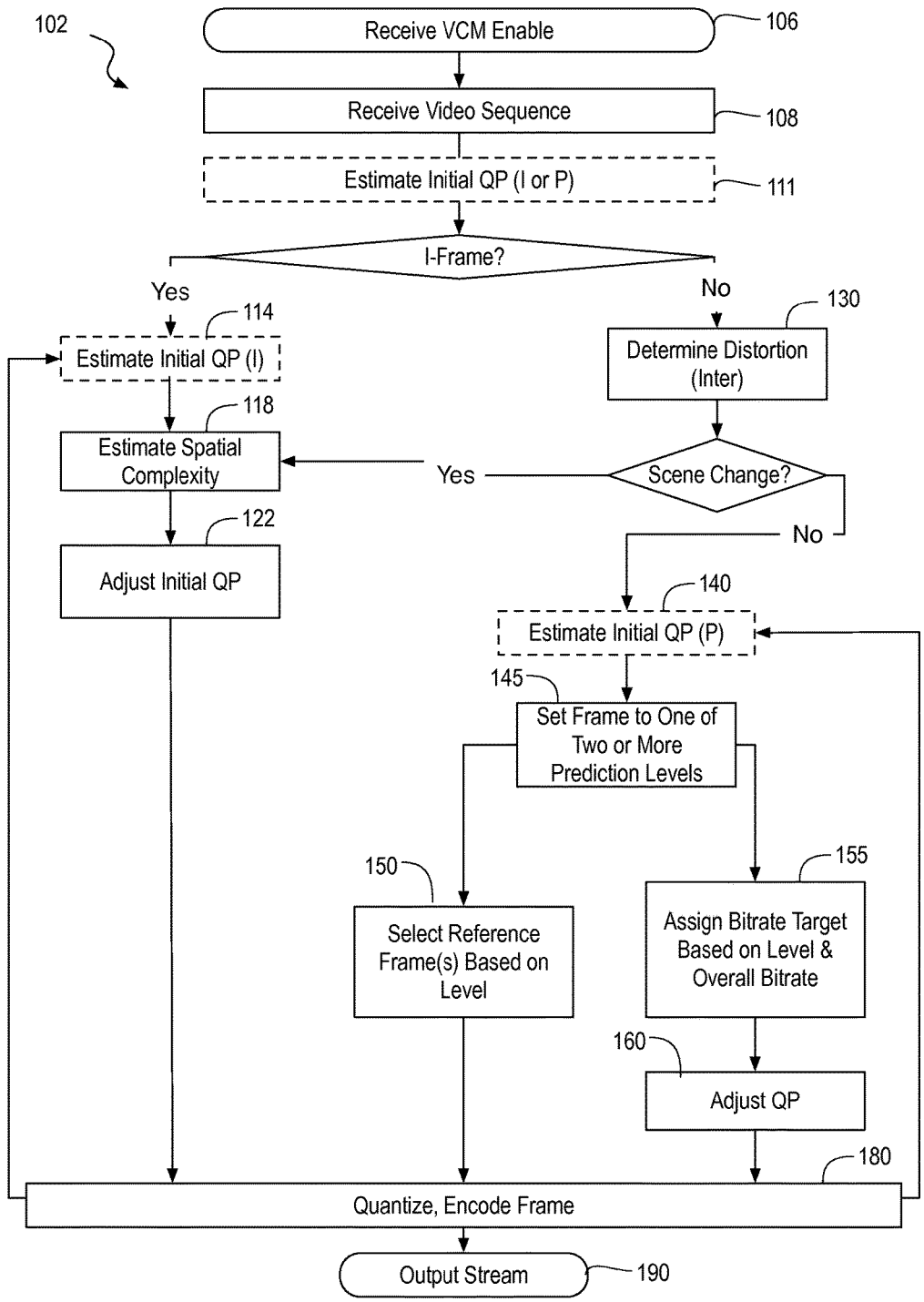
FIG. 1B is a flow diagram depicting a method of determining QP in a video conferencing mode, in accordance with an embodiment.

FIG. 1B is a flow diagram depicting a method 102 for determining QP in a video conferencing mode, in accordance with an embodiment. The method 102 may be performed at the QP determination operation 120 in FIG. 1A, for example. The operations of method 102 may be described in a linear or serial manner for the sake of clarity of presentation. In practice however, the operations of method 102 may be performed in any order and/or in parallel. For example, multiple frames may be processed at once using method 102.

Method 102 begins with receipt of a VCM enable signal at operation 106. Video sequence received at operation 108 is then processed to determine QP for each successive video data chunk or unit, which in the exemplary embodiment corresponds to a frame. QP determination begins with an initial QP value(s) estimation, $QP_0$, which may include initial estimations of frame level QP values for one or more frames of a video sequence received at operation 108 (e.g., a scene of a video). Any technique may be utilized to determine this initial QP value and in one example the initial QP value is determined in the same manner as it would be determined in a default (non-VCM) mode. The initial QP estimation may be independent of frame type (e.g., same for either I- or P-frame), and performed at operation 111 for example. Alternatively, the initial QP value for a video frame may be determined at operations 114 and 140 in a manner that is dependent on frame type. For example, frame type offset dependent on the frame type (e.g., I-frame, P-frame, B-frame, or B-reference frame) may be applied to a QP precursor as part of the initial QP estimations performed at operation 114 and 140. These alternate embodiments of the initial QP estimation are illustrated in FIG. 1B with dashed lines.

Method 102 proceeds to make VCM adjustments to the initial QP estimate in a manner dependent upon frame type. For each I-frame, spatial complexity is estimated at operation 118. The spatial complexity may be determined using any suitable technique to generate a measure of the spatial complexity of a video frame. In an embodiment, the spatial complexity is estimated based on intra-prediction distortion of the frame. A measure of intra prediction distortion may be further based on a statistic such as a sum of absolute differences, a summation of distortion, or the like. In further embodiments, intra-prediction distortion may be determined based on a down-sampled version of a video frame. For example, a frame may be down-sampled by a factor of 2, 4, 8, etc. prior to the intra-prediction distortion determination.

At operation 122, the initial QP is adjusted based on the spatial complexity estimate to arrive at a VCM intra-frame quantization parameter value, $QP_{INTRA}$. In one such embodiment, QP is adjusted proportionally to a measure of spatial complexity and further offset by the measure of spatial complexity. In one exemplary embodiment where the spatial complexity measure is intra-prediction distortion, the VCM intra-frame QP value is determined as:

$$QP_{INTRA}=QP_0(I) \times \text{Distortion(Intra)}^C/\text{Threshold1}-\text{OffsetI(Distortion(Intra))}, \quad (1)$$

where $QP_0(I)$ is the initial QP value for the I-frame, Distortion(Intra) is the intra-prediction distortion, and C and Threshold1 are predetermined constants that may be empirically derived. C may be any suitable value or constant such as, for example, 1, or any non-integer value. C and Threshold1 may be based on the method used to determine the spatial complexity and/or based on the content of video such that C and/or Threshold1 may be adaptive or variable over time. OffsetI( ) is a function of the intra-prediction distortion that varies inversely with the intra-prediction error. In one embodiment where $QP_0(I)$ varies between 1 and 51, OffsetI( ) is in the range of 1 to 10, increasing with decreasing intra-prediction distortion. Therefore, the VCM adjusted QP can be expected to be lower than the initial QP estimate. The frame is then quantized and/or encoded at quantization/encoding operation 180 using the VCM intra-frame quantization parameter value in any known manner. Method 102 then completes with stream output operation 190.

In further embodiments, for each inter-predicted frame, method 102 adjusts the initial QP value in a manner dependent upon detection of a scene change. A scene change may occur in the context of a video conference for example when video of a human speaker switches to a slide demonstration. In the exemplary embodiment, the QP value for an inter-predicted frame classified as having a scene change is adjusted in the same manner as the QP value adjustment for an I-frame. Scene change detection may be predicated on operation 130 where temporal complexity is assessed based on inter-frame distortion.

In response to detecting a scene change, method 102 proceeds to operation 118 if an initial I-frame QP determination has been made (e.g., where $QP_0$ is independent on whether a frame is of an intra or inter predicted type), otherwise method 102 proceeds to operation 114 where $QP_0$ is determined (not depicted). Spatial complexity is further determined at operation 118 and the initial QP adjusted at operation 122. As such, an initial QP for an inter-predicted frame associated with a scene change is determined and then adjusted in a manner similar to that described above for an I-frame. In the exemplary embodiment, the initial QP is adjusted at operation 122 based on both a spatial complexity estimate and temporal complexity estimate to arrive at a VCM inter-frame quantization parameter value, $QP_{INTER,scene\ \Delta}$. In a further embodiment, $QP_0$ is adjusted proportionally to a measure of temporal complexity associated with the frame, and further offset by a measure of spatial complexity associated with the frame. In the exemplary embodiment where the temporal complexity measure is inter-prediction distortion determined at operation 130 and the spatial complexity measure is intra-prediction distortion determined at operation 118, the VCM inter-frame QP value when there is a scene change is determined as:

$$QP_{INTER,scene\ \Delta} = QP_0(I) \times \text{Distortion(Inter)}^C / \text{Threshold2} - \text{OffsetI}(\text{Distortion(Intra)}), \quad (2)$$

where $QP_0(I)$ is the initial QP value determined for the intra-predicted frame using a I-frame formulation if $QP_0$ is dependent on whether a frame is of an intra- or inter-predicted type, and reducing simply to $QP_0$ if there is no such dependency in the initial QP estimation. Distortion (Inter) is the inter-prediction distortion, and C and Threshold2 are predetermined constants. OffsetI( ) is a function of the intra-prediction distortion that varies inversely with the intra-prediction error, just as described above in the context of an I-frame.

Selection of one or more reference frames for the inter-predicted frame with a scene change may proceed following any known technique as embodiments herein are not limited in this respect. Method 201 then continues with quantization and encoding operation 180 using $QP_{INTER,scene\ \Delta}$. Any known rate control algorithm may then be utilized, for example in a feedback loop, to modulate the $QP_0$ determination (e.g., operation 114) to encode at the desired rate. A rate control algorithm may also be utilized to modulate and/or modulate the $QP_0(I)$ offset as needed to encode at the desired rate. The resulting encoded stream is output at operation 190.

Where no scene change is detected, method 102 continues at operation 140 where an initial inter-predicted QP value (e.g., $QP_0(P)$) is determined if it has not already been determined for the inter-predicted frame (e.g., at operation 111). The initial QP value for an inter-predicted frame is then adjusted based on a bitrate target (BRT) assigned to the frame. In embodiments, an inter-predicted frame BRT is assigned according to the position or index within a cycle associated with two or more different inter-predicted frame bitrate targets and provides an average bitrate target over a plurality of inter-predicted frames. The BRT may be determined so as to leverage a strong temporal correlation of frames.

In one exemplary embodiment, a BRT is associated with an "inter-prediction level." At operation 145, the inter-predicted frame is assigned to one of two or more predetermined inter-prediction levels. The number of discrete levels may vary, but is at least two. The inventors have found four levels to be a reasonable upper limit, although a larger number of levels may also be implemented. The number of levels may be a parameter definable by an end user or application. In one exemplary embodiment, the highest inter-prediction level is associated with a minimum BRT, and each lower level is associated with some function of the minimum BRT so as to form a hierarchical level structure. In the exemplary embodiment, each successively lower level is associated with BRT that is larger than the next higher level by some scaling function. For example, where there are two inter-prediction levels, a "low" level may be associated with a BRT that is scaled by 1.5-2 times the BRT of the "high" level. In another example where there are three inter-prediction levels, a "low" level may be associated with a BRT that is, for example, 1.5× greater than the BRT of the "high" level, while a "medium" level may be associated with a BRT that falls somewhere between the BRT of the "low" and "high" levels.

As a function of the level assignment operation 145, the inter-predicted frame BRT is assigned to the frame at operation 155 based on the inter-prediction level and the average bitrate target to be allocated over the different inter-prediction levels defined at operation 145. At operation 160, the initial QP is adjusted based on an assigned BRT for the frame. In further embodiments, the initial QP is adjusted based on both the BRT and inter-prediction distortion for the frame. In the exemplary embodiment, the initial QP (or some function of the initial QP) is adjusted by an offset that is a function of both inter-prediction distortion and the BRT.

In embodiments, the QP offset is either additive to, or subtractive from, the initial QP as a function of the BRT. For example, QP may be reduced if the BRT is above some predetermined threshold and increased if the BRT is below the threshold. This BRT threshold may be normalized by the average bitrate targeted for inter-predicted frames within one BRT cycle. As described further below, the ratio of BRT/average inter-predicted frame bitrate target is dependent on the extent of temporal correlation among the frames. In one example where there are two bitrate targets, each one associated with an inter-prediction level, the offset is subtracted from the initial QP for a frame assigned the larger BRT (lower inter-prediction level) while the offset is added to the initial QP for a frame assigned the smaller BRT (higher inter-prediction level). In further embodiments where the offset is subtractive, the initial QP is to be reduced by an increasing amount as inter-prediction distortion decreases. Where the offset is additive, the initial QP is to be increased by an increasing amount as inter-prediction distortion increases. Hence, the magnitude of the QP adjustment is at least also partially dependent upon the inter-prediction error (e.g. determined at operation 130). In one exemplary embodiment, QP for an inter-predicted frame not associated with a scene change is determined as:

$$QP_{INTER} = QP_0(P) - \text{Offset}P(\text{Distortion(Inter)}, \text{Bitrate\_Target/Average\_Bitrate}), \quad (3)$$

where $QP_0(P)$ is the initial QP value determined for the frame using a P-frame formulation if $QP_0$ is dependent on whether a frame is of an intra or inter predicted type, or reducing simply to $QP_0$ if there is no such dependency in the initial QP estimation. OffsetP( ) is the function that varies in sign as a function of the Bitrate_Target/Average_Bitrate ratio, and further varies in magnitude as the function of the inter-prediction distortion as described above.

In further embodiments, in addition to varying QP adjustment cyclically over a sequence of inter-predicted frames, the reference frame(s) is(are) identified for the inter-predicted frame based on the BRT, or an indication thereof, associated with each candidate reference inter-predicted frame. The reference frame selection may therefore be determined so as to also leverage a strong temporal correlation of frames. A reference frame may be selected from a pool of candidate reference inter-predicted frames so as to prioritize those reference frames within the inter-predicted frame sequence that have the largest BRT. In one exemplary video conferencing embodiment where the inter-predicted frame is a P-frame and only a single reference frame is allowed, a P-frame may reference either the previous lowest level frame (highest BRT) for motion search, or select the immediately preceding (N−1) frame as the reference. In further embodiments, a decision between these two frames is based on a distortion comparison. In another exemplary video conferencing embodiment where the inter-predicted frame is a P-frame and multiple reference frames are allowed, a preceding lower-level frame with high BRT is given higher selection priority than a preceding higher-level frame with low BRT. In any of these embodiments, a cost function (e.g., based on inter-frame distortion) may be enlisted to select a reference frame from candidate frames. If the cost function is substantially equal (i.e., less a predetermined threshold of difference) for a given pair of frames, then the frame prioritized on the basis of BRT is selected.

Method 102 then continues with quantization and encoding operation 180 using $QP_{INTER\_\Delta}$ and the selected reference frame(s). Any known rate control algorithm may then be utilized, for example in a feedback loop, to modulate the $QP_0$ determination at operation 140 to encode at the desired rate. A rate control algorithm may also be utilized to modulate and/or modulate the BRT assignment operation 155 (not depicted), for example by changing one or more of the bitrate target values to varying the $QP_0(P)$ offset as needed to encode at the desired rate. The resulting encoded stream is output at operation 190.

Notably, although within the framework of many codecs it is expected that inter-predicted frames be limited to P-frames in video conferencing applications, and so the figures and discussion are presented in the context of P-frames, the QP adjustments and reference frame selections described in method 102 are also applicable for a VCM mode having a coding structure that further includes B-frames. In one such embodiment, all P-frames are assigned to a low inter-prediction level associated with high target bitrate while all B-frames are assigned to a high inter-prediction level associated with a low target bitrate. QP adjustment may then follow equation (3) above substantially as described.

Figure 2A:
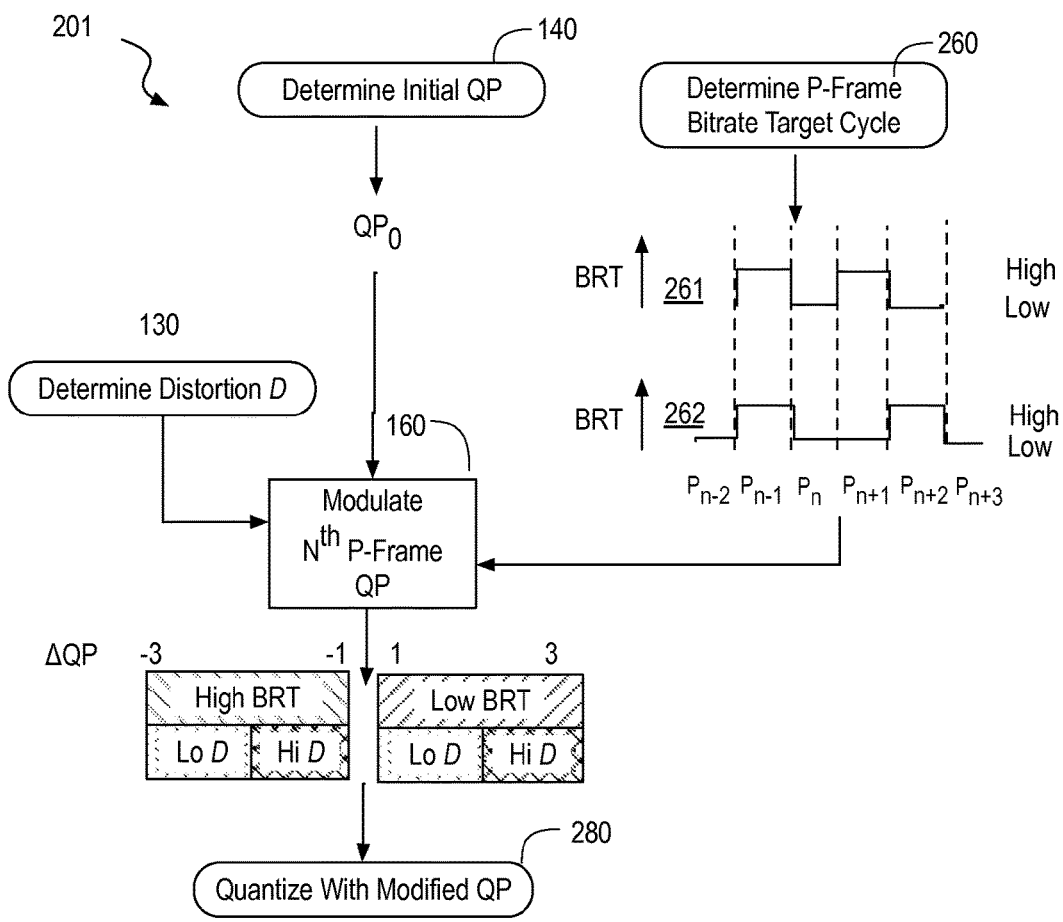
FIG. 2A is a flow diagram illustrating a method of determining QP for a P-frame, when in a video conferencing mode in accordance with an embodiment.

FIG. 2A is a flow diagram illustrating a method 201 for determining QP for an $N^{th}$ P-frame, when in a video conferencing mode, in accordance with an embodiment. Method 201 further illustrates the concepts introduced in method 102 (FIG. 1B). The operations illustrated in FIG. 2A may be described in a linear or serial manner for the sake of clarity of presentation. In practice however, the operations of method 201 may be performed in any order and/or in parallel.

Method 201 begins with determining the initial quantization parameter $QP_0$ at operation 140, and distortion(inter) D at operation 130, as described above. At operation 260, a P-frame BRT cycle is determined, for example based on the number of inter-prediction levels to be applied to a sequence of consecutive P-frames. A BRT cycle and/or inter-prediction level cycle may include a number of high-level (i.e., lower bitrate target) frames for each low-level (i.e., larger bitrate target) frame such that consecutive low-level frames are spaced apart by a number of high-level frames. In an embodiment, the number of high-level, low BRT frames intervening between two successive low-level, high BRT frames is a function of the temporal correlation of the inter-predicted frames. If the temporal correlation is strong, the interval between low-level frames will be larger (i.e., more high-level frames). The ratio of the maximum BRT/average BRT for all inter-predicted frames in the cycle will also be larger where the high-level frames are set to a same, reference minimum BRT. Conversely, where the temporal correlation is weak, there are fewer high-level frames at the reference minimum BRT, and therefore the more frequent low-level frame has a smaller maximum BRT/average BRT ratio. In the examples illustrated in FIG. 2A, there are two P-frame bitrate targets: "low" and "high". The BRT cycle 261 comprises one high BRT frame and one low BRT frame for a 50% low BRT duty cycle. The BRT cycle 262 comprises one high BRT frame and two low BRT for a 66% low BRT duty cycle. In embodiments where the low BRT is set to a predetermined minimum, the high BRT frame in BRT cycle 262 can have a higher target bitrate than does the high BRT frame in BRT cycle 261 for a same P-frame BRT average. In other words, the maximum Bitrate_Target/Average_Bitrate for BRT cycle 262 is larger than that of BRT cycle 261. With the smaller low BRT duty cycle, BRT cycle 261 may be applied to a P-frame sequence having weaker temporal correlation, while cycle 262 is suitable for a P-frame sequence having stronger temporal correlation. Either of these exemplary BRT cycles may be applied to a sequence of P-frames according the position of the current P-frame within the BRT cycle. For example, the $N^{th}$ P-frame is assigned a low BRT according to both cycles 261 and 262. However, an $N^{th}$+/P-frame will be assigned a high BRT according to cycle 261, but would again receive the low BRT if cycle 262 is applied.

Figure 2B:
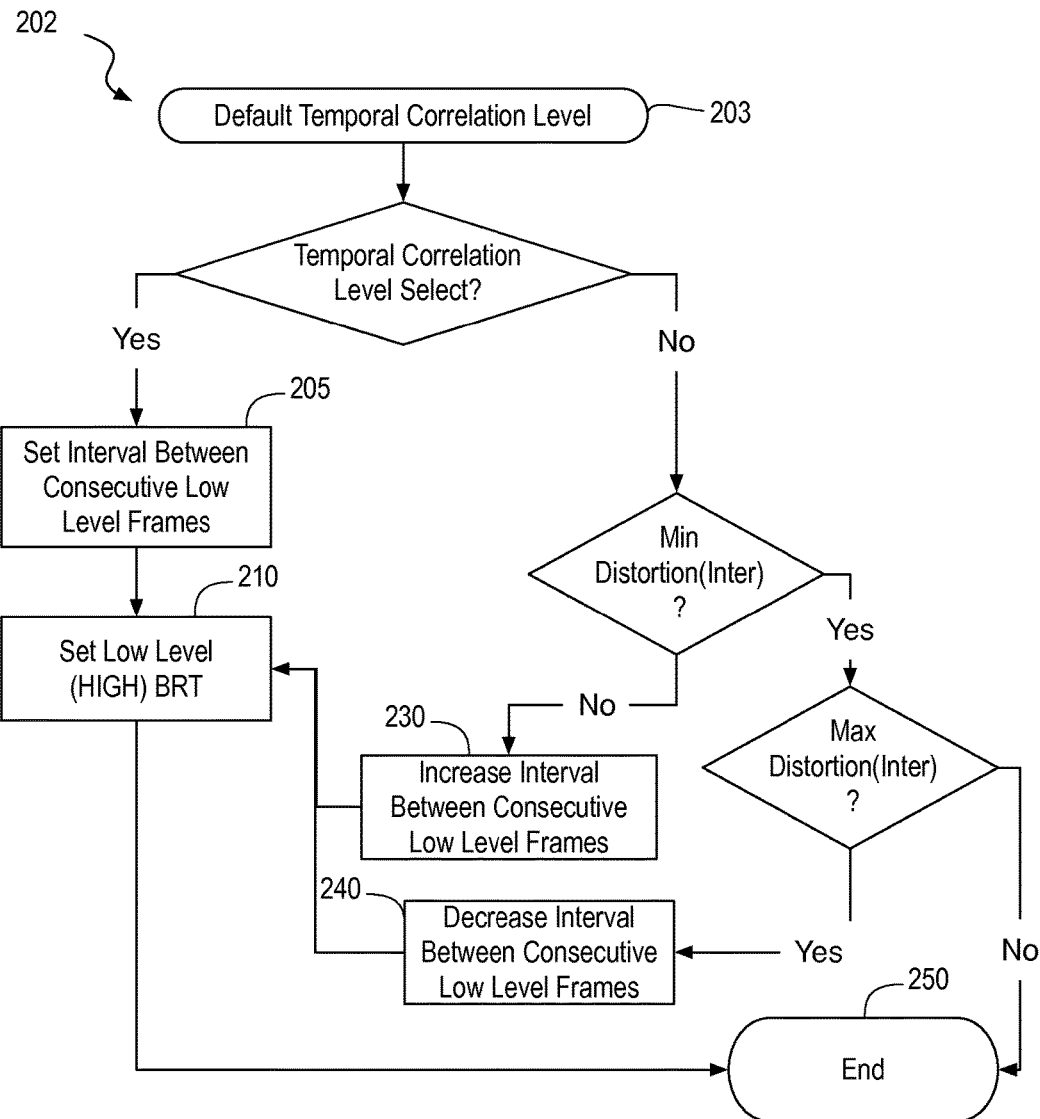
FIG. 2B is a flow diagram depicting a method of determining and adjusting a bitrate target cycle, which may be employed for determining QP in a video conferencing mode, in accordance with an embodiment.

FIG. 2B is a flow diagram depicting a method 202 for determining and/or adjusting a BRT cycle in accordance with an embodiment. Method 202 may for example occur over a number of frames, for example requiring 30 sec-2 min, or more, depending on frame rate. In one exemplary embodiment method 202 is performed to change from the BRT cycle 261 (FIG. 2A) to the BRT 262. The operations illustrated in FIG. 2B may be described in a linear or serial manner for the sake of clarity of presentation. In practice however, the operations of method 202 may be performed in any order and/or in parallel.

In FIG. 2B, method 202 begins at operation 203 with a predetermined default temporal correlation level and associated BRT cycle. The default correlation level may be associated with a low BRT duty cycle and/or low maximum Bitrate_Target/Average_Bitrate to ensure QP modulation from $QP_0$ doesn't exceed a predetermined threshold. As one example, the BRT cycle 261 in FIG. 2A may be associated with the default correlation level. Method 202 then determines if a non-default temporal correlation level has been selected, for example by an end user, or video conferencing management application, on the basis of foreknowledge that the video conference will have a specific temporal correlation. If the level of temporal correlation is known, the interval between consecutive low(est)-level frames is set to a corresponding predetermined level at operation 205. Based on this interval, the high BRT (lowest inter-prediction level) is set to be some amount larger than a predetermined minimum BRT for the intervening high-level frame(s) using a scaling function at operation 210. For example, for a BRT cycle with a 50% low BRT duty cycle (i.e., two alternating inter-prediction levels), an exemplary high BRT may be given as High BRT=2(Average BRT)−Low BRT. The difference between high and low BRT may be further apportioned for embodiments with more than two levels.

In response to inter-frame distortion failing to exceed a predetermined minimum inter-prediction error threshold, method 202 proceeds to operation 230 where the interval between consecutive low(est)-level frames is increased, for example through the addition of one more intervening high-level frame. The low inter-prediction level BRT for the new BRT cycle is then recalculated at operation 210 to sequence the different BRT based on the minimum BRT, maximum BRT, and interval so as to avoid exceeding the average BRT. In response to inter-frame distortion exceeding the predetermined minimum inter-prediction error threshold, and exceeding the a predetermined maximum inter-prediction error threshold, method 202 proceeds to operation 240 where the interval between consecutive low(est)-level frames is decreased, for example through the removal of one intervening high-level frame. The low inter-prediction level BRT for the new BRT cycle is then again calculated at operation 210, and method 202 ends at operation 250. If both the minimum and maximum distortion thresholds are satisfied, method 202 ends at operation 250 with the BRT cycle previously determined. Method 202 may then be performed continuously, initiated periodically, or upon some trigger.

Returning to FIG. 2A with the BRT cycle determined, $QP_0$ is modulated for the $N^{th}$ P-frame at operation 160 based one the assigned BRT and distortion(inter) D, for example following equation (3) discussed above. As illustrated in FIG. 2A, the QP adjustment ($\Delta QP$) varies from −1 to −3 for a high bitrate target as a function of the distortion(inter) D, and varies from 1 to 3 for a low bitrate target as a function of the distortion(inter) D. Hence $\Delta QP$ has a relatively large span of 6 in comparison to a $QP_0$ that may for example range between 1 and 51. Limits on $QP_{INTER}$ may be imposed so as to maintain $QP_{INTER}$ within the same range permitted for $QP_0$. Following either bitrate rate target cycle 261 or 262, QP is increased from $QP_0$ for the $N^{th}$ P-frame. Method 201 then completes at operation 280 where any known quantization is performed with the modulated QP.

FIGS. 3A, 3B, 3C, and 3D depict bitrate targets and references over multiple video frames, which may be determined by practicing one or more of methods 102, 201, and 202 in accordance with embodiments.

Figure 3A:
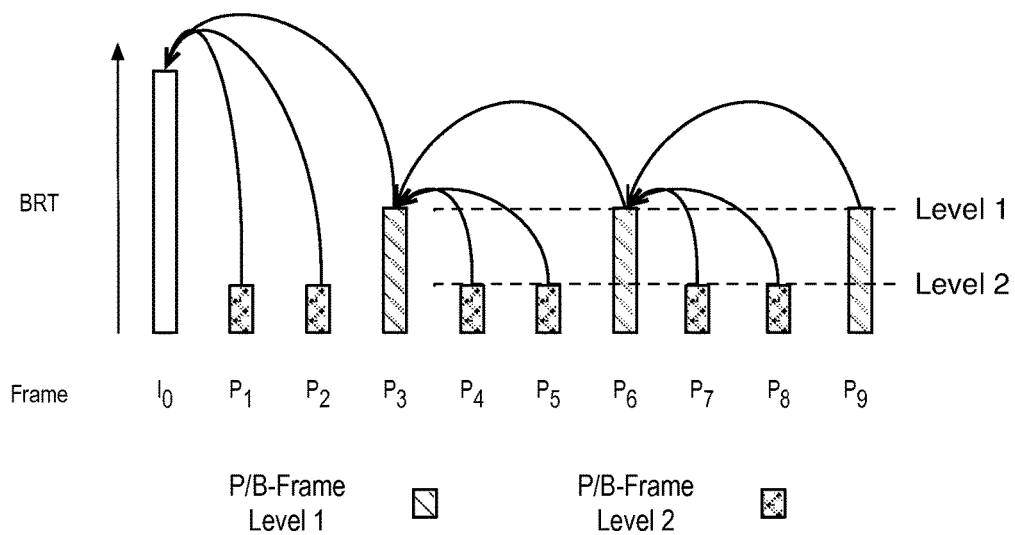
FIG. 3A, 3B, 3C, and 3D depict bitrate targets and references over multiple video frames, in accordance with embodiments.
Figure 3B:
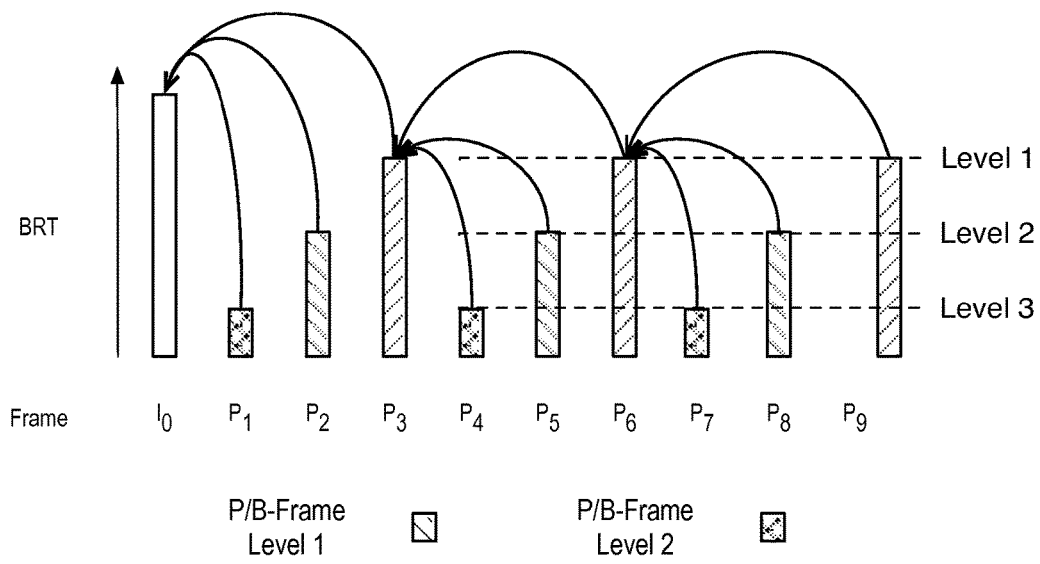
Figure 3C:
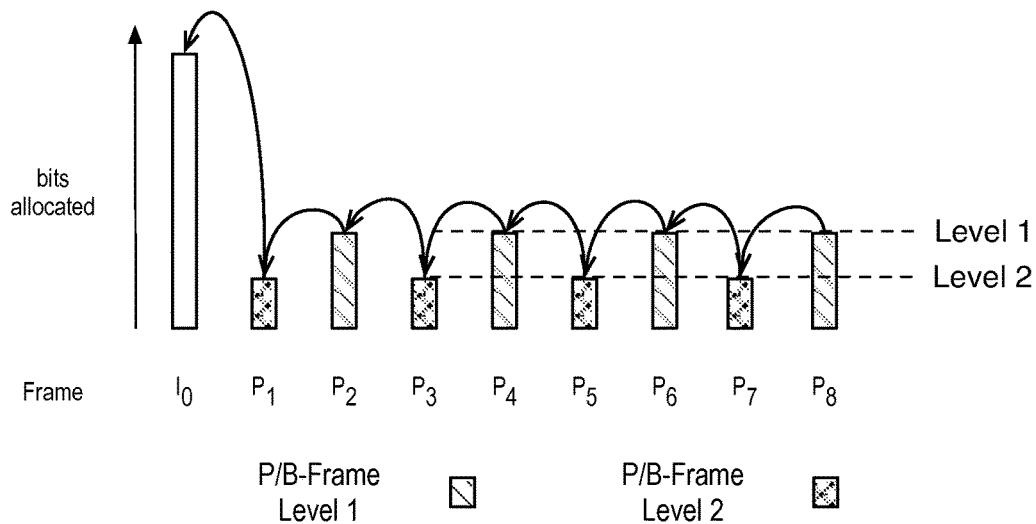
Figure 3D:
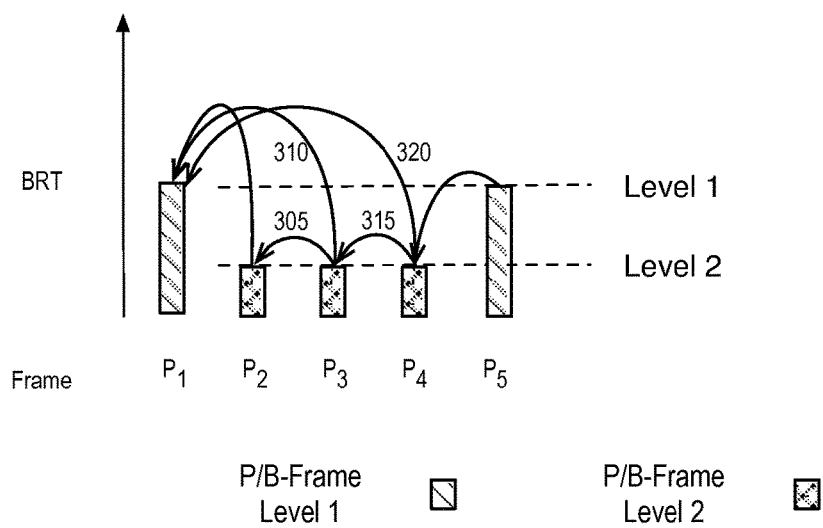

FIG. 3A illustrates a BRT cycle and reference frame selection with IPPP coding structure. As shown, intra-predicted frame $I_0$ is encoded to a highest effective BRT. Frames $P_3$, $P_6$, and $P_9$ are set as lower-level frames with high BRT. Frames $P_1$, $P_2$, $P_4$, $P_5$, $P_7$ and $P_8$ are set as higher-level frames with a low BRT. This "high, high, low" structure matches the BRT cycle 262 illustrated in FIG. 2B, for example. As further shown in FIG. 3A, only the lower-level frames are referenced by the subsequent higher-level frames, for example as a result of the priority assigned to the lower-level frames. FIG. 3B illustrates a BRT cycle and reference frame selection with the IPPP coding structure and three inter-prediction levels, each associated with a different BRT. FIG. 3C illustrates another BRT cycle and reference frame selection, for example corresponding to BRT cycle 261 illustrated in FIG. 2B. As shown in FIG. 3C, successive frames alternate between high and low inter-prediction levels that are equidistant from the average BRT for the sequence. The BRT associated with Level 1 in FIG. 3C is smaller than that associated with Level 1 in FIG. 3A. FIG. 3C further illustrates an exemplary embodiment where each P-frame references the immediately preceding frame. FIG. 3D illustrates another exemplary BRT cycle and reference frame selection. In this embodiment, frame $P_3$ has references 305 and 310 to both the immediately preceding frame and the preceding lower-level frame $P_1$, respectively. Likewise, frame $P_4$ has references 315 and 320 to both the immediately preceding frame and the preceding lower-level frame $P_1$, respectively.

Figure 4:
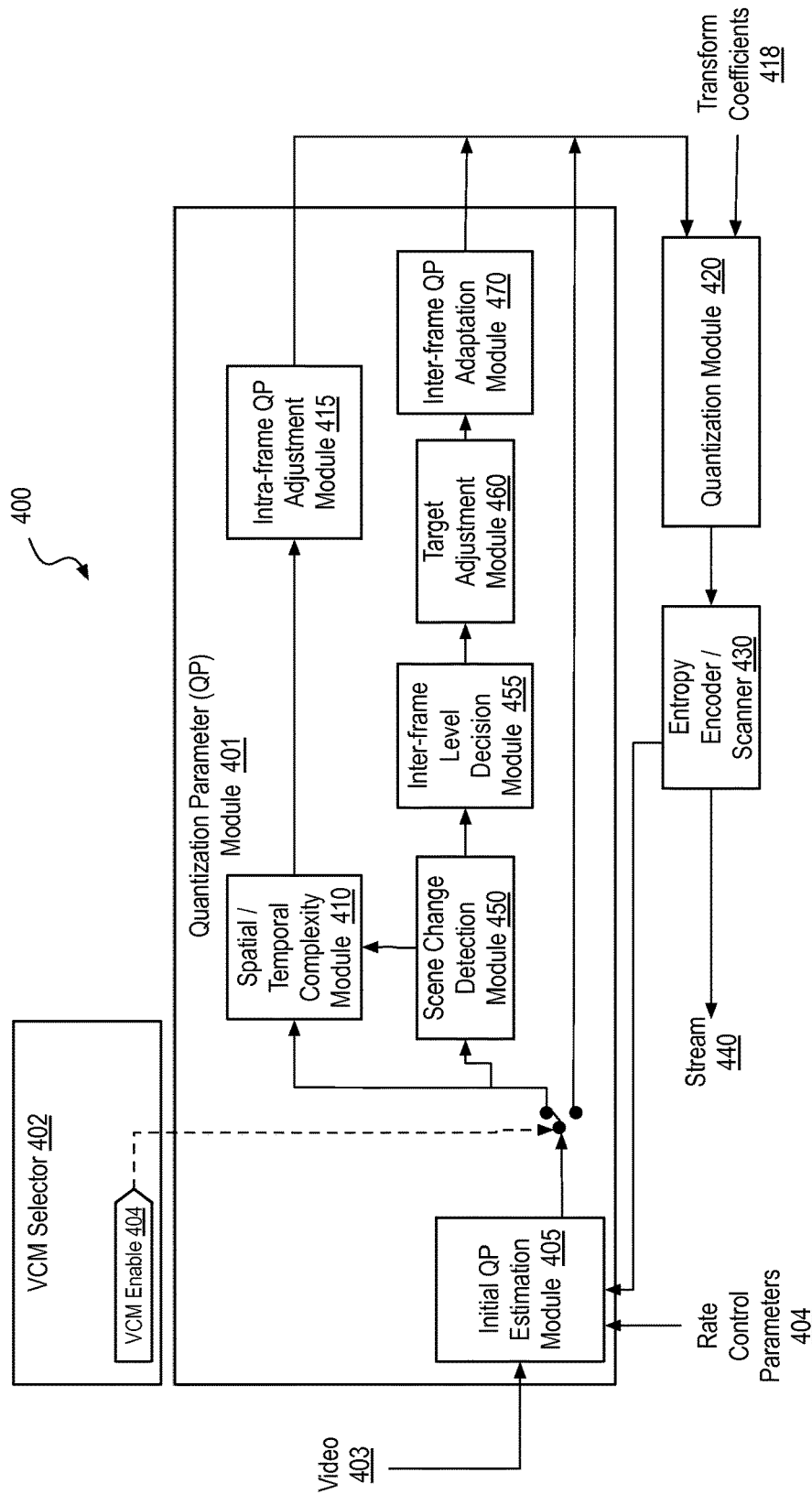
FIG. 4 is a block diagram illustrating a video processing system including a QP parameter module configured for multiple QP determination modes, including a video conferencing mode, in accordance with an embodiment.

FIG. 4 is a block diagram illustrating a video processing system 400 including a QP parameter module 401 operable in multiple QP determination modes, including a video conferencing mode, in accordance with an embodiment. QP module 401 includes an initial QP estimation module 405 with inputs coupled to a video input 403 and a rate control parameter input 404. Output from initial QP estimation module 405 is selectably coupled through VCM selector 402 to quantization module 420, spatial/temporal complexity module 410, and scene change detection module 450. In response to a first VCM enable signal 404, output from initial QP estimation module 405 is coupled to spatial/temporal complexity module 410, and scene change detection module 450. In response to a second VCM enable signal 404, or lack thereof, output from initial QP estimation module 405 is coupled to quantization module 420, bypassing spatial/temporal complexity module 410, and scene change detection module 450. Output from spatial/temporal complexity module 410 is coupled to intra-frame QP adjustment module 415, which has an output further coupled to quantization module 420. One output from scene change detection module 450 is coupled to spatial/temporal complexity module 410. Another output from scene change detection module 450 is coupled to inter-frame level decision module 455, which has an output further coupled to target adjustment module 460. Output from target adjustment module 460 is coupled to inter-frame QP adaptation module 470, which has an output further coupled to quantization module 420. In addition to the QP input, quantization module 420 received transform coefficients 418 from an upstream source (not depicted). Output of Quantization module 420 is coupled to entropy encoder 430, which has a rate control feedback output coupled back to initial QP estimation module 405 and an encoded video stream output 440.

QP module 401 is to determine a QP value in a default mode and in VCM. When in VCM, QP module 401 is to output an adapted QP value for at least one of intra-frames and inter-frames. In the exemplary embodiment QP module 401 is to output an adapted QP value for both intra-frames (e.g., $QP_{INTRA}$) and inter-frames (e.g., $QP_{INTER}$). In certain embodiments, one or more of the modules depicted within QP module 401 is implemented as fixed function logic circuitry. In further embodiments, one or more of the modules depicted within QP module 401 is implemented by programmable logic circuitry executing software instructions configuring the programmable logic circuitry.

Initial QP estimation module 405 is to determine an initial QP. Initial QP estimation module 405 is to perform one or more of operations 111, 114, and 140 illustrated in FIG. 1B to determine a $QP_0$, $QP_0(I)$, and/or $QP_0(P)$, etc. In the exemplary embodiment illustrated in FIG. 4, initial QP estimation module 405 is to perform operation 111. Referring again to FIG. 4, the initial QP value is passed to quantization module 420 unless VCM enable 404 places QP module 401 into VCM, in which case the initial QP is passed to spatial/temporal complexity module 410 and/or scene change detection module 450. In certain embodiments, initial QP estimation module 405 is implemented as fixed function logic circuitry. In other embodiments, initial QP estimation module 405 is implemented by programmable logic circuitry executing software instructions configuring the programmable logic circuitry.

Spatial/temporal complexity module 410 is to determine spatial and/or temporal complexity measures for an input I-frame. In the exemplary embodiment, spatial/temporal complexity module 410 is to perform at least operation 118 illustrated in FIG. 1B. In certain embodiments, spatial/temporal complexity module 410 is implemented as fixed function logic circuitry. In other embodiments, spatial/temporal complexity module 410 is implemented by programmable logic circuitry executing software instructions configuring the programmable logic circuitry.

Intra-frame QP adjustment module 415 is to adapt the QP received from initial QP estimation module 405 to account for the actual spatial complexity of the current frame. In the exemplary embodiment intra-frame QP adjustment module 415 is to perform at least operation 122 illustrated in FIB. 1B, for example applying equation (1) and/or equation (2) above. In certain embodiments, intra-frame QP adjustment module 415 is implemented as fixed function logic circuitry. In other embodiments, intra-frame QP adjustment module 415 is implemented by programmable logic circuitry executing software instructions configuring the programmable logic circuitry.

Scene change detection module 450 is to detect a scene change in an input inter-predicted frame (e.g., P-frame). In an embodiment scene change detection module 450 is to perform at least operation 130 illustrated in FIG. 1B to determine inter-prediction distortion and detect scene change based on the determined inter-prediction distortion. Scene change detection module 450 is to output the initial QP estimate to either spatial/temporal complexity module 410 to treat the QP adaptation for the inter-predicted frame in the same manner as an I-frame in response to detecting a scene change, or to pass the initial QP estimate on to inter-frame level decision module 455. In certain embodiments, scene change detection module 450 is implemented as fixed function logic circuitry. In other embodiments, scene change detection module 450 is implemented by programmable logic circuitry executing software instructions configuring the programmable logic circuitry.

Inter-frame level decision module 455 is to determine and/or assign one of two or more inter-prediction levels and/or BRT to the inter-predicted frame. In an exemplary embodiment, inter-frame level decision module 455 is to perform at least one of operation 145, 150, and/or 155 illustrated in FIG. 1B. In certain embodiments, inter-frame level decision module 455 is implemented as fixed function logic circuitry. In other embodiments, inter-frame level decision module 455 is implemented by programmable logic circuitry executing software instructions configuring the programmable logic circuitry.

Target adjustment module 460 is to adjust BRT for one or more inter-predicted frames. In embodiments, target adjustment module 460 is to adjust a frame BRT assignment and/or a BRT cycle based on at least inter-prediction distortion. In the exemplary embodiment, target adjustment module 460 is to perform method 202 illustrated in FIG. 2B to adjust a frame BRT assignment made by inter-frame level decision module 455 and/or a BRT cycle being applied by inter-frame level decision module 455. In certain embodiments, target adjustment module 460 is implemented as fixed function logic circuitry. In other embodiments, target adjustment module 460 is implemented by programmable logic circuitry executing software instructions configuring the programmable logic circuitry.

Inter-frame QP adaptation module 470 is adjust the initial QP estimate based on at least one of inter-prediction distortion and BRT for an inter-predicted frame. In one exemplary embodiment inter-frame QP adaptation module 470 is to perform operation 160 illustrated in FIG. 1B, for example apply equation (3) above.

Quantization module 420 is to perform quantization of input transform coefficients 418 by applying the VCM-adapted or default QP value to any known quantization algorithm(s) and/or technique(s). Entropy encoder/scanner 420 is further to entropy encode quantized coefficients by implementing any known entropy encoding algorithm(s) and/or technique(s). Entropy encoder/scanner 430 is further to scan out the encoded symbols following any known scanning algorithm and/or technique(s) to form output video stream 440.

Figure 5:
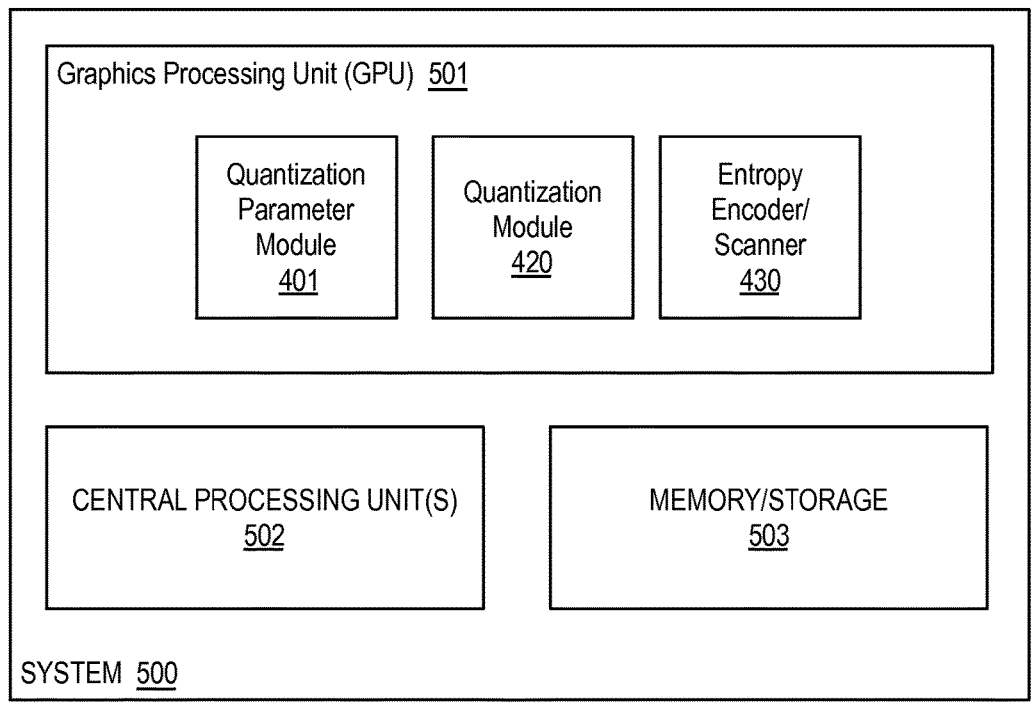
FIG. 5 is a block diagram illustrating a system QP parameter module configured for multiple QP determination modes, including a video conferencing mode, in accordance with an embodiment.

FIG. 5 is an illustrative diagram of an example system 500 configured to encode video in at least a video conferencing mode, arranged in accordance with an embodiment. As shown in FIG. 5, system 500 may include a graphics processing unit (GPU) 501, one or more central processing units 502, and memory stores 503. Also as shown, GPU 501 may include quantization parameter module 401, quantization module 420, and/or entropy encoder/scanner module 430. In the example of system 500, memory stores 503 may store video content such as video frames and/or a bitstream.

Graphics processing unit 501 may include any number and type of graphics processing units that may provide the operations as discussed herein. Such operations may be implemented via software or hardware or a combination thereof. In an embodiment, the illustrated modules of graphics processing unit 501 may be implemented with logic circuitry. For example, graphics processing unit 501 may include circuitry dedicated to manipulate video data to generate compressed image data. Central processing unit(s) 502 may include any number and type of processing units or modules that may provide control and other high level functions for system 500. Memory stores 503 may be any type of memory such as volatile memory (e.g., Static Random Access Memory (SRAM), Dynamic Random Access Memory (DRAM), etc.) or non-volatile memory (e.g., flash memory, etc.), and so forth. In an embodiment, memory stores 503 may be configured to store video data such as frame-level quantization parameters, quantized transform coefficients, a bitstream, or any other video data discussed herein. In a non-limiting example, memory stores 503 may be implemented by cache memory of GPU 501. In an embodiment, quantization parameter module 401, quantization module 420, and/or entropy encoder module 430 may be implemented via an execution unit (EU) of graphics processing unit 501. The EU may include, for example, programmable logic or circuitry such as a logic core or cores that may provide a wide array of programmable logic functions. In an embodiment, quantization parameter module 401, quantization module 420, and/or entropy encoder module 430 may be implemented via dedicated hardware such as fixed function circuitry or the like. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of system 400 or system 500 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example methods (e.g., methods 101, 102, 201, 202) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 500, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
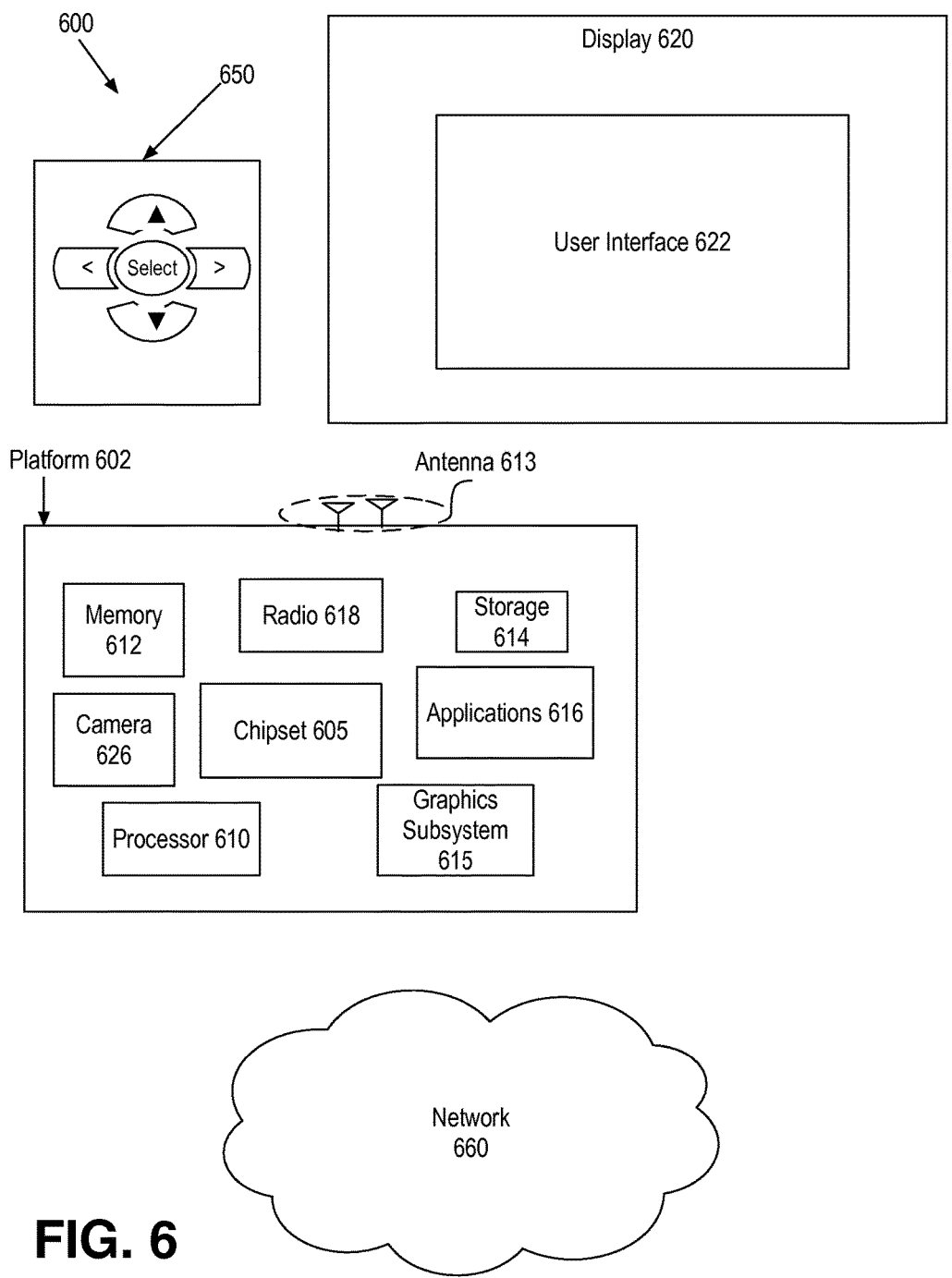
FIG. 6 is a block diagram of an exemplary system employing one or more processor including logic to record video, determine QP in a video conferencing mode, and encode the recorded video with the determined QP, in accordance with one or more embodiment.

FIG. 6 is a block diagram of an exemplary system employing one or more processor including logic to record video, determine QP in a video conferencing mode, and encode the recorded video with the determined QP, in accordance with one or more embodiment. System 600 may implement all or a subset of the various functional blocks depicted in FIG. 4 or FIG. 5. For example, in one embodiment a graphics processor 615 implements a graphics processing system that includes the QP module 401, for example having one or more of the features described elsewhere herein to perform any of the methods described in the context of FIG. 1A, 1B, 2A, or 2B. In one specific exemplary embodiment, graphics processor 615 includes fixed-function and/or programmable logic circuitry within at least one video encoding module, execution unit (EU), or other IP core, to adapt QP while in a video conferencing mode. System 600 may be a mobile device although system 600 is not limited to this context. For example, system 600 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 600 may also be an infrastructure device. For example, system 600 may be incorporated into a large format television, set-top box, desktop computer, or other home or commercial network device.

In embodiments, system 600 includes a platform 602 coupled to a HID 620. A navigation controller 650 including one or more navigation features may be used to interact with, for example, platform 602 and/or HID 620. Camera 626 may record image data and generate video data for processing by other components of system 600.

In embodiments, platform 602 may include any combination of a chipset 605, processor 610, memory 612, storage 614, graphics processor 615, applications 616 and/or radio 618. Chipset 605 may provide intercommunication among processor 610, memory 612, storage 614, graphics processor 615, applications 616, or radio 618. For example, chipset 605 may include a storage adapter (not depicted) capable of providing intercommunication with storage 614.

Processor 610 may be implemented as one or more Complex Instruction Set Computer (CISC) or Reduced Instruction Set Computer (RISC) processors; x86 instruction set compatible processors, multi-core, or any other microprocessor or central processing unit (CPU). In embodiments, processor 610 may be a multi-core processor(s), multi-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may include technology to increase the storage performance enhanced protection for valuable digital media when multiple hard drives are included, for example.

Graphics processor 615 may perform processing of images such as still or video media data for display, or perform general computing functions in a highly parallel manner. Graphics processor 615 may include one or more GPU, or visual processing unit (VPU), for example. An analog or digital interface may be used to communicatively couple graphics processor 615 and display 620. For example, the interface may be any of a High-Definition Multimedia Interface, Display Port, wireless HDMI, and/or wireless HD compliant techniques. Graphics processor 615 may be integrated with central processor 610 onto a single chip (i.e., SoC) as a graphics core or provided as part of chipset 605. In some implementations, graphics processor 615 may be a stand-alone card communicatively coupled to chipset 605. In various exemplary embodiments, graphics processor 615 and/or central processor 610 invokes or otherwise implements VCM QP adaptation. Graphics processor 615 includes functionality to perform VCP QP adaptation.

The QP adaptation processes exemplified herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 618 may include one or more radios capable of transmitting and receiving signals using various suitable wireless communications techniques. Such techniques may involve communications across one or more wireless networks 660. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, HID 620 may include any television type monitor or display. HID 620 may include, for example, a computer display screen, touch screen display, video monitor, television-like device, and/or a television. HID 620 may be digital and/or analog. Under the control of one or more software applications 616, platform 602 may display user interface 622 on HID 620.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., HID 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or HID 620. The present disclosure, however, is not limited to the elements or in the context shown or described herein.

In embodiments, system 600 may be implemented as a wireless system, a wired system, or a combination of both. When implemented as a wireless system, system 600 may include components and interfaces suitable for communicating over a wireless shared media, such as one or more antennas 613, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 7:
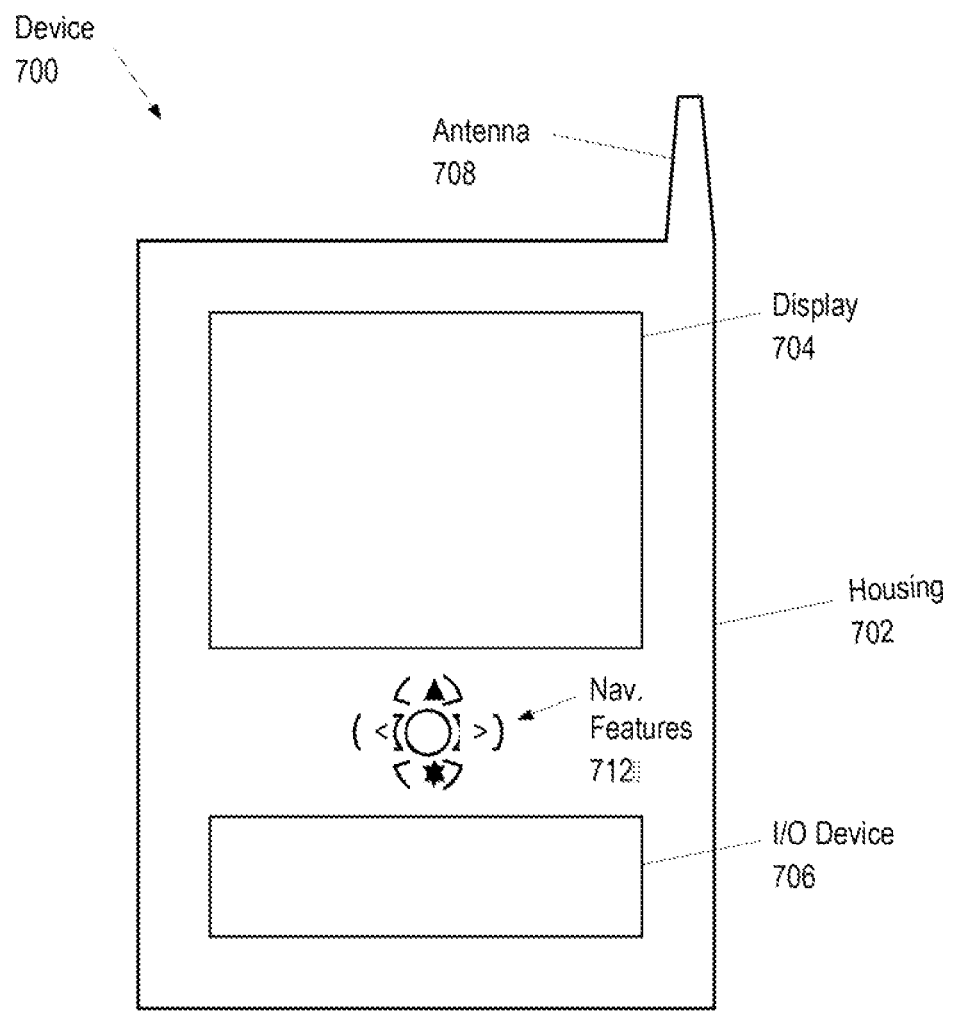
FIG. 7 is a diagram of an exemplary system, arranged in accordance with one or more embodiment.

As described above, system 600 may be embodied in varying physical styles or form factors. FIG. 7 illustrates embodiments of a small form factor device 700 in which system 600 may be further embodied. In embodiments, for example, device 700 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown), or may be digitized by a voice recognition device. Embodiments are not limited in this context.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiment, a computer-implemented method for video coding includes determining an initial quantization parameter (QP) for a video frame, or a portion thereof. The method further includes assigning a bitrate target to the frame according to an inter-predicted frame bitrate target cycle that includes a sequence of two or more inter-predicted frame bitrate targets. The method further includes modifying the initial QP based on the bitrate target assigned to the frame. The further method includes quantizing the frame, or the portion thereof based on the modified QP.

In furtherance of the one or more first embodiment, assigning the bitrate targets to the frame further comprises assigning either a first or a second bitrate target. Modifying the initial QP based on the assigned bitrate target further comprises decreasing the initial QP, or a function thereof, in response to assigning the first bitrate target, and increasing the initial QP, or a function thereof, in response to assigning the second bitrate target.

In furtherance of the one or more first embodiment, the method further includes determining an inter-prediction distortion for the frame. The method further includes modifying the initial QP based on both the assigned bitrate target and the inter-prediction distortion.

In furtherance of the one or more first embodiment, the method further includes determining an inter-prediction distortion for the frame. The method further includes modifying the initial QP based on the assigned bitrate target and the inter-prediction distortion. Assigning the bitrate target to the frame further comprises assigning either a first or a second bitrate target. Modifying the initial QP based on the assigned bitrate target and the inter-prediction distortion further comprises subtracting an offset from the initial QP, or a function thereof, in response to assigning the first bitrate target, the offset increasing with decreasing inter-prediction distortion. Modifying the initial QP based on the assigned bitrate target and the inter-prediction distortion further comprises adding an offset to the initial QP, or a function thereof, in response to assigning the second bitrate target, the offset increasing with increasing inter-prediction distortion.

In furtherance of the one or more first embodiment, the method further includes identifying a reference frame from a pool of candidate reference P-frames based on the bitrate target, or an indication thereof, assigned to each candidate reference P-frame.

In furtherance of the embodiment immediately above, identifying the reference frame further comprises prioritizing a candidate reference P-frame having a high target bitrate over a candidate reference P-frame having a low target bitrate. Identifying the reference frame further comprises limiting the candidate reference P-frame pool to an immediately preceding P-frame, and to the most recent P-frame having a higher target bitrate than the immediately preceding P-frame. Identifying the reference frame further comprises selecting from the limited candidate reference frame pool based on a distortion comparison.

In furtherance of the one or more first embodiment, the method further includes determining a second initial QP for a second frame, or a portion thereof. The method further includes modifying the second initial QP based on spatial complexity associated with the second frame. The method further includes quantizing and encoding the second frame, or the portion thereof, as an intra-predicted frame (I-frame) based the modified second QP.

In furtherance of the embodiment immediately above, modifying the second initial QP further comprises determining an intra-prediction distortion for the second frame. Modifying the second initial QP further comprises reducing the second initial QP, or a function thereof, by an offset that is a function of the intra-prediction distortion, the offset increasing with decreasing intra-prediction distortion.

In furtherance of the one or more first embodiment, the method further includes determining a second initial QP for a second frame, or portion thereof. The method further includes modifying, in response to detecting a scene change in the second frame, the second initial QP based on at least one of a spatial complexity or a temporal complexity associated with the second frame. The method further includes quantizing the second frame, or the portion thereof, as a P-frame based on the modified second QP.

In furtherance of the embodiment immediately above, modifying the second initial QP further comprises determining an inter-prediction distortion for the second frame. Modifying the second initial QP further comprises determining an intra-prediction distortion for the second frame. Modifying the second initial QP further comprises reducing a function of second initial QP and the inter-prediction distortion by an offset that is a function of the intra-prediction distortion, the offset increasing with decreasing intra-prediction distortion.

In furtherance of the one or more first embodiment, determining the target bitrate cycle further comprises determining an average bitrate target for encoding a plurality of P-frames. Determining the target bitrate cycle further comprises determining an interval between maximum bitrate target frames across the plurality of P-frames. Determining the target bitrate cycle further comprises determining the maximum bitrate target based on the interval and average bitrate target. Determining the target bitrate cycle further comprises sequencing the different bitrate targets based on the interval and maximum bitrate target to avoid exceeding the average bitrate target.

In one or more second embodiment, a system for providing video coding on a computing device includes a memory configured to store video data. The device further includes a video processor coupled to the memory. The video processor comprises a quantization parameter (QP) module to determine an initial QP for a video frame. The QP module is further to assign a bitrate target to the frame according to a position within an inter-predicted frame bitrate target cycle that includes a sequence of two or more inter-predicted frame bitrate targets. The QP module is further to modify the initial QP based on the bitrate target assigned to the frame. The video processor comprises a quantization module coupled to the QP module to quantize the frame based on the modified QP.

In furtherance of the one or more second embodiment, the QP module further comprises an inter-frame level decision module to assign either a first or a second bitrate target to the video frame. The QP module further comprises an inter-frame QP adaptation module to modify the initial QP by decreasing the initial QP, or a function thereof, in response to the first bitrate target being assigned to the frame. The QP module further comprises an inter-frame QP adaptation module to modify the initial QP by increasing the initial QP, or a function thereof, in response to the second bitrate target being assigned to the frame.

In furtherance of the one or more second embodiment, the QP module further comprises an inter-frame level decision module to identify a reference frame from a pool of candidate reference P-frames by prioritizing a candidate reference P-frame having a high target bitrate over a candidate reference P-frame having a low target bitrate.

In furtherance of the one or more second embodiment, the QP module further comprises an initial QP estimation module to determine a second initial QP for a second frame, or a portion thereof. The QP module further comprises an intra-frame QP adjustment module to modify the second initial QP based on at least spatial complexity associated with the second frame. The quantization module is further to quantize the second frame, or the portion thereof, based the modified second QP.

In furtherance of the embodiment immediately above, the intra-frame QP adjustment module is further to determine an inter-prediction distortion for the second frame. The intra-frame QP adjustment module is further to determine an intra-prediction distortion for the second frame. The intra-frame QP adjustment module is further to reduce a function of second initial QP and the inter-prediction distortion by an offset that is a function of the intra-prediction distortion, the offset increasing with decreasing intra-prediction distortion.

In one or more third embodiments, one or more machine-readable medium has a plurality of instructions stored thereon which, when executed on a computing device, cause the computing device to perform a method of video coding comprising determining an initial quantization parameter (QP) for a video frame, or a portion thereof. The method further including assigning a bitrate target to the frame according to an inter-predicted frame bitrate target cycle that provides an average bitrate over a plurality of inter-predicted frames, and includes a sequence of two or more inter-predicted frame bitrate targets. The method further including modifying the initial QP based on the bitrate target assigned to the frame. The method further including quantizing and encoding the frame, or the portion thereof, as an inter-predicted frame based on the modified QP.

In furtherance of the one or more third embodiments, the one or more machine-readable medium further comprising instructions stored thereon which, when executed on a computing device, cause the computing device to perform a method of video coding comprising determining an inter-prediction distortion for the frame. The method further including modifying the initial QP based on the assigned bitrate target and the inter-prediction distortion. Assigning the bitrate target to the frame further comprises assigning either a first or a second bitrate target. Modifying the initial QP based on the assigned bitrate target and the inter-prediction distortion further comprises subtracting an offset from the initial QP, or a function thereof, in response to assigning the first bitrate target, the offset increasing with decreasing inter-prediction distortion. Modifying the initial QP based on the assigned bitrate target and the inter-prediction distortion further comprises adding an offset to the initial QP, or a function thereof, in response to assigning the second bitrate target, the offset increasing with increasing inter-prediction distortion.

In furtherance of the one or more third embodiment, one or more machine-readable medium further comprises instructions stored thereon which, when executed on a computing device, cause the computing device to perform a method of video coding including determining a second initial QP for a second frame, or a portion thereof. The method further including modifying the second initial QP based on spatial complexity associated with the second frame. The method further including quantizing and encoding the second frame, or the portion thereof, as an intra-predicted frame (I-frame) based the modified second QP.

In one or more fourth embodiment, ne or more machine-readable medium has a plurality of instructions stored thereon which, when executed on a computing device, cause the computing device to perform any one of the one or more first embodiments.

In one or more fifth embodiment, a system for providing video coding on a computing device include a storage means configured to store video data. The system further includes a video processing means coupled to the storage means, wherein the video processing means is to perform any one of the one or more first embodiments.

In one or more sixth embodiment, a system for providing video coding on a computing device includes a storage means configured to store video data. The system further includes a video processing means coupled to the storage means. The video processing means comprises a quantization parameter (QP) determination means to determine an initial QP for a video frame. The QP determination means to assign a bitrate target to the frame according to a position within an inter-predicted frame bitrate target cycle that includes a sequence of two or more inter-predicted frame bitrate targets. The QP determination means to modify the initial QP based on the bitrate target assigned to the frame. The video processing means comprises a quantization means coupled to the QP determination means to quantize the frame based on the modified QP.

In furtherance of the one or more third embodiment, the QP determination means further comprises an inter-frame level decision means to assign either a first or a second bitrate target to the video frame. The QP determination means further comprises an inter-frame QP adaptation means to modify the initial QP by decreasing the initial QP (or a function thereof) in response to the first bitrate target being assigned to the frame, and by increasing the initial QP (or a function thereof) in response to the second bitrate target being assigned to the frame.

In furtherance of the one or more sixth embodiment, the QP determination means further includes an inter-frame level decision means to identify a reference frame from a pool of candidate reference P-frames by prioritizing a candidate reference P-frame having a high target bitrate over a candidate reference P-frame having a low target bitrate.

In furtherance of the one or more sixth embodiment, the QP determination means further includes an initial QP estimation means to determine a second initial QP for a second frame, or a portion thereof. The QP determination means further includes an intra-frame QP adjustment means to modify the second initial QP based on at least spatial complexity associated with the second frame. The quantization means coupled to the QP determination means is to quantize the second frame, or the portion thereof, based the modified second QP.

In furtherance of the embodiment immediately above, the intra-frame QP adjustment means is further to determine an inter-prediction distortion for the second frame. The intra-frame QP adjustment means is further to determine an intra-prediction distortion for the second frame. The intra-frame QP adjustment means is further to reduce a function of second initial QP and the inter-prediction distortion by an offset that is a function of the intra-prediction distortion, the offset increasing with decreasing intra-prediction distortion.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented method for video coding comprising:
    designating a sequence of frames in received video data as inter-predicted P-frames;
    determining an initial quantization parameter (QP) for the P-frames, or portions thereof;
    assigning a plurality of different bitrate targets across the sequence of P-frames according to a P-frame bitrate target cycle that includes a sequence of P-frame bitrate targets forming at least two inter-prediction levels wherein each level has multiple P-frames with a same single bitrate target assigned to the level, and wherein the bitrate target is different from level to level, and wherein the cycle refers to a temporal sequence of consecutive P-frames formed into a same repeating pattern after an I-frame and before a next I-frame, wherein consecutive P-frames on one level are separated from each other by at least one P-frame of at least one other of the levels along the repeating patterns;
    changing the cycle over time comprising changing the repeating pattern to add or remove the number of P-frames to be assigned to at least one of the levels to change an average bitrate;
    modifying the initial QP for each of the P-frames based on the bitrate target assigned to the P-frames;
    quantizing the P-frames, or the portions thereof, based on the modified QPs; and
    generating an encoded bitstream comprising a representation of the P-frames based on the quantizing.

2. The method of claim 1, further comprising determining inter-prediction distortion for the P-frames; and wherein:
    the P-frame bitrate target cycle comprises only a first and second bitrate targets of first and second levels respectively, the first bitrate target being higher than the second bitrate target;
    assigning the bitrate targets across the P-frames further comprises assigning the first and second bitrate targets to consecutive ones of the P-frames according to a duty cycle that spaces the first bitrate target by a number of occurrences of the second bitrate target, the duty cycle being a function of the inter-prediction distortion; and
    modifying the initial QP based on the assigned bitrate target further comprises decreasing the initial QP, or a function thereof, by a first amount for a first of the P-frames based on the inter-prediction distortion determined for the first of the P-frames in response to assigning the first bitrate target to the first P-frame; and
    modifying the initial QP based on the assigned bitrate target further comprises increasing the initial QP, or a function thereof, by a second amount for a second of the P-frames based on the inter-prediction distortion determined for the second of the P-frames in response to assigning the second bitrate target to the second P-frame.

3. The method of claim 1, wherein the method further comprises identifying a reference frame from the P-frames based on the bitrate target, or an indication thereof, assigned to each P-frame.

4. The method of claim 3, wherein identifying the reference frame further comprises prioritizing a candidate reference P-frame having a high target bitrate over a candidate reference P-frame having a low target bitrate.

5. The method of claim 3, wherein identifying the reference frame further comprises:
    limiting the candidate reference P-frame pool to an immediately preceding P-frame, and to the most recent P-frame having a higher target bitrate than the immediately preceding P-frame; and
    selecting from the limited candidate reference frame pool based on a distortion comparison.

6. The method of claim 1, further comprising:
    designating a frame in the video data as an intra-predicted frame (I-frame);
    determining a second initial QP for the I-frame, or a portion thereof;
    modifying the second initial QP based on spatial complexity associated with the I-frame; and
    quantizing and encoding the I-frame, or the portion thereof, based on the modified second QP.

7. The method of claim 6, wherein modifying the second initial QP further comprises:
    determining an intra-prediction distortion for the I-frame;
    reducing the second initial QP, or a function thereof, by an offset that is a function of the intra-prediction distortion, the offset increasing with decreasing intra-prediction distortion.

8. The method of claim 1, further comprising:
    receiving in the video data a frame designated as an intra-predicted frame (I-frame);
    determining a second initial QP for the I-frame, or a portion thereof;
    modifying, in response to detecting a scene change in the I-frame, the second initial QP based on at least one of a spatial complexity or a temporal complexity associated with the I-frame; and
    quantizing the I-frame, or the portion thereof, based on the modified second QP.

9. The method of claim 1, wherein determining the bitrate target cycle further comprises:
    determining an average bitrate target for encoding the P-frames;
    determining an interval between maximum bitrate target frames across the P-frames;

determining the maximum bitrate target based on the interval and average bitrate target; and sequencing the different bitrate targets based on the interval and maximum bitrate target to avoid exceeding the average bitrate target.

10. A system for providing video coding on a computing device, comprising a memory configured to store video data, and a processor coupled to the memory, wherein the processor is to:

designate sequence of frames in the video data as inter-predicted P-frames;

determine an initial quantization parameter (QP) for the P-frames, or portions thereof;

assign a plurality of different bitrate targets across the sequence of P-frames according to a position within a P-frame bitrate target cycle that includes a sequence of P-frame bitrate targets forming at least two inter-prediction levels wherein each level has multiple P-frames with a same single bitrate target assigned to the level, and wherein the bitrate target is different from level to level, and wherein the cycle refers to a temporal sequence of consecutive P-frames formed into a same repeating pattern after an I-frame and before a next I-frame wherein consecutive P-frames of one level are separated from each other by at least one P-frame of at least one other of the levels along the repeating patterns;

change the cycle over time comprising changing the repeating pattern to add or remove the number of P-frames to be assigned to at least one of the levels to change an average bitrate;

modify the initial QP for each of the P-frames based on the bitrate target assigned to the P-frames;

quantize the P-frames, or the portions thereof, based on the modified QPs; and generate an encoded bitstream comprising a representation of the P-frames based on the quantizing.

11. The system of claim 10, wherein the P-frame bitrate target cycle comprises only first and second bitrate targets, the first bitrate target being higher than the second bitrate target; and wherein the processor is further to:

determine inter-prediction distortion for the P-frames;

assign the first and second bitrate targets to consecutive ones of the P-frames according to a duty cycle that spaces the first bitrate target by a number of occurrences of the second bitrate target according to a function of the inter-prediction distortion determined for the P-frames; and modify the initial QP by decreasing the initial QP, or a function thereof, by a first amount for a first of the P-frames based on the inter-prediction distortion determined for the first of the P-frames in response to the first bitrate target being assigned to the first P-frame; and modify the initial QP by increasing the initial QP, or a function thereof, by a second amount for a second of the P-frames based on the inter-prediction distortion determined for the second of the P-frames in response to the second bitrate target being assigned to the second P-frame.

12. The system of claim 10, wherein the QP module further comprises an inter-frame level decision module to identify a reference frame from the P-frames by prioritizing a candidate reference P-frame having a high target bitrate over a candidate reference P-frame having a low target bitrate.

13. The system of claim 10, wherein the processor is to:
designate a frame in the video data an I-frame;
determine a second initial QP for the I-frame, or a portion thereof;
modify the second initial QP based on at least spatial complexity associated with the I-frame; and
quantize the I-frame, or the portion thereof, based the modified second QP.

14. One or more non-transitory machine-readable storage medium having a plurality of instructions stored thereon which, when executed on a computing device, cause the computing device to perform a method of video coding comprising:

designating a sequence of frames in received video data as inter-predicted P-frames;

determining an initial quantization parameter (QP) for the P-frames, or portions thereof;

assigning a plurality of different bitrate targets across the sequence of P-frames according to a position within a P-frame bitrate target cycle that includes a sequence of P-frame bitrate targets forming at least two inter-prediction levels wherein each level has multiple P-frames with a same single bitrate target assigned to the level, and wherein the bitrate target is different from level to level, and wherein the cycle refers to a temporal sequence of consecutive P-frames formed into a same repeating pattern after an I-frame and before a next I-frame wherein consecutive P-frames of one level are separated from each other by at least one P-frame of at least one other of the levels along the repeating patterns;

change the cycle over time comprising changing the repeating pattern to add or remove the number of P-frames to be assigned to at least one of the levels to change an average bitrate;

modifying the initial QP for each of the P-frames based on the bitrate target assigned to the P-frames;

quantizing the P-frames, or the portions thereof, based on the modified QPs; and generating an encoded bitstream comprising a representation of the P-frames based on the quantizing.

15. The one or more machine-readable storage medium of claim 14, further comprising instructions stored thereon which, when executed on a computing device, cause the computing device to perform a method of video coding comprising:

designating a frame in the video data as an intra-predicted frame (I-frame);

determining a second initial QP for the I-frame, or a portion thereof;

modifying the second initial QP based on spatial complexity associated with the I-frame; and quantizing and encoding the I-frame, or the portion thereof based on the modified second QP.

16. The method of claim 1 wherein all of the inter-prediction levels have P-frames.

17. The method of claim 1 comprising adjusting P-frame assignments to different inter-prediction levels to adjust the average bitrate, wherein the adjusting comprises changing the repeating pattern by changing an interval between the consecutive P-frames on at least one of the levels and that is the number of P-frames of other levels between the consecutive P-frames.

18. The method of claim 1 wherein the current P-frames on the same level have the same reference frame dependency pattern within the repeating pattern and comprising a number of reference and dependent frames, prediction type of reference and dependent frames, and a temporal position of the reference and dependent frames along the video sequence and in a distance from the current P-frame, and depending on the level of the current P-frame, wherein position and distance refers to a number of frame spaces along the video sequence.

19. The method of claim 1 wherein the P-frame bitrate targets of different inter-prediction levels are scaled relative to each other by a scale function.

20. The method of claim 17 wherein the average bitrate target is adjusted by changing an interval between consecutive frames on the same level by either adding a frame to the level or removing a frame from the level thereby moving a repeating pattern position of frames from one level to another level according to a change in the repeating pattern.

21. The method of claim 1 wherein the repeating pattern is a 50% cycle so that alternating P-frames are on two different levels.

22. The method of claim 1 wherein the repeating pattern is a 66% cycle where two consecutive P-frames are on one level and a third P-frame is on another level of a three-frame repeating pattern.

23. The method of claim 1 wherein the repeating pattern forms three P-frames on one level after one P-frame on another level of a four-frame repeating pattern.

24. The method of claim 1 wherein there are three levels, and the repeating pattern includes three consecutive P-frames each at a different level.

25. The method of claim 18 wherein the changing of the cycle comprises changing the interval between consecutive P-frames on at least one level to change the repeating pattern from an initial repeating pattern to a subsequent repeating pattern so that frames that were to be assigned a reference frame dependency pattern of one level of the initial repeating pattern are now to be given a reference frame dependency pattern of a different level due to the subsequent repeating pattern.

* * * * *